(12) United States Patent
Chujo et al.

(10) Patent No.: US 6,606,177 B1
(45) Date of Patent: Aug. 12, 2003

(54) DRIVER CIRCUIT AND OPTICAL-TRANSMISSION MODULE

(75) Inventors: Norio Chujo, Tokyo (JP); Yoshihiko Hayashi, Tokyo (JP); Akio Osaki, Yokohama (JP); Naohiko Baba, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/392,566

(22) Filed: Sep. 9, 1999

(30) Foreign Application Priority Data

Feb. 15, 1999 (JP) .......................................... 11-035300

(51) Int. Cl.[7] ............................................. H04B 10/04
(52) U.S. Cl. ....................................... 359/181; 359/180
(58) Field of Search ................................. 359/181, 180, 359/187, 109

(56) References Cited

U.S. PATENT DOCUMENTS

| | | | | |
|---|---|---|---|---|
| 4,295,226 A | * | 10/1981 | Dombrowski | 250/551 |
| 5,224,111 A | * | 6/1993 | Stilwell et al. | 359/109 |
| 5,646,560 A | | 7/1997 | Nguyen | |
| 5,724,170 A | * | 3/1998 | Aizawa | 359/187 |
| 6,087,899 A | * | 7/2000 | Kubota | 330/253 |

FOREIGN PATENT DOCUMENTS

| | | |
|---|---|---|
| EP | 0 744 800 A2 | 11/1996 |
| JP | 9-130167 | 5/1997 |
| JP | 1075132 | 3/1998 |

OTHER PUBLICATIONS

MAXIM catalog, Maxim Integrated Products, pp. 1–2.
Technical report of IEICE, ICD95–74 (Aug. 1995), pp. 31–36.

* cited by examiner

*Primary Examiner*—John Tweel
(74) *Attorney, Agent, or Firm*—Antonelli, Terry, Stout & Kraus, LLP

(57) ABSTRACT

A driver circuit comprises a first differential-amplifier circuit having a pair of first transistors with emitters thereof connected to each other and a first resistor provided between an emitter connection point of the first transistors and a first power supply. Different electric potentials are applied to the bases of the pair of the first transistors to set a ratio of a current flowing through one of the pair of the first transistors to a current flowing through the other first transistor at about 1/100 or smaller. An amplitude of an output current is controlled by the higher of the electric potentials applied to the base of one of the first transistors.

31 Claims, 10 Drawing Sheets

DRIVER CIRCUIT AND OPTICAL-TRANSMISSION MODULE

BACKGROUND

The present invention relates to a driver circuit capable of generating an output with a large amplitude from a low power-supply voltage, and also relates to an optical-transmission module employing the driver circuit stated above.

FIG. 14 shows an example of an optical network studied by the inventors in developing the present invention.

The optical network of FIG. 14 uses various optical fibers which send signals at different signal speeds such as 50 Mbps, 600 Mbps, 2.5 Gbps and 10 Gbps. Devices 52 such as transmitting devices and routers employed in the optical network have optical transmitting modules 46, optical receiving modules 53, and optical modules 54 which effectively combine the optical transmitting modules 46 and the optical receiving modules 53, which modules handle signals at their signal speed.

The optical transmitting modules 46, as shown in FIG. 15, can be electrically connected to logic circuits such as a MUX circuit 55 for making low-speed signals time division multiplexed, a header adding circuit 56 for inserting a header, which includes necessary information for the network such as information for error detection, to data, and a scrambling circuit 57 for protecting data from continuing the same data "0" or "1" for a long period of time. The logic circuits such as the MUX circuit 55, the header adding circuit 56, and the scrambling circuit 57 are applied with a low power-supply voltage such as 5V or −5.2~3.3V for making them low power consumption devices.

A driver circuit employing an optical transmitting module 46 for transmitting signals at low speed less than 600 Mbps comprises a changeable-current supply and current mirror circuit. And it can work with a low power-supply voltage of 3.3V. Such circuits are described in the MAXIM company catalog MAX3667 and are especially shown in FIG. 1 of page 6 of this catalog.

On the other hand, as described on pages 31 to 36 of a technology-research report ICD95-74 of the Institute of Electronics and Communication Engineers of Japan written in the year of 1995, and in particular, as shown in FIG. 8 on page 34 of this thesis, a driver circuit employing an optical transmitting module such as module 46 for transmitting signals at high speed more than 2.5 Gbps is fabricated by adopting a GaAs process to increase the processing speed of the driver circuit. The driver circuit employs a pair of transistors with the emitters thereof connected to each other to function as a differential-amplifier circuit and a constant-current supply circuit connected to the emitter connection point of the pair of transistors. Such a driver circuit 10 is shown in FIG. 12. As shown in the figure, the driver circuit 10 comprises a pair of transistors 11 and 12 forming a differential-amplifier circuit. The transistors 11 and 12 are each a FET (field effect transistor) made of GaAs. The emitters of the transistors are connected to each other. A constant-current supply circuit 13 is provided between the emitter connection point of the transistors 11 and 12 and a power supply 8. The constant-current supply circuit 13 comprises a transistor 15, a resistor 16 and a voltage supply 14. The driver circuit 10 drives a load 2.

However, the related art technology described above, and studied by the inventors, has the following problems.

The driver circuit which comprises a changeable-current supply and a current returning circuit needs a complementary bipolar process for making PNP transistor as a vertical structure and a NPN transistor as a vertical structure on the same chip. Therefore, since it makes the chip structure complicated, the performance of the transistor is inferior to a transistor made by a bipolar process, not a complementary bipolar process. Therefore, this driver circuit can't employ the optical transmitting module for transmitting signals at high speed.

The GaAs FETs employed in the driver circuit which has the optical transmitting module for transmitting signals at high speed are expensive in comparison with a bipolar transistor made of a material such as Si. By merely replacing the pair of FETs employed in the related art driver circuit with low-cost bipolar transistors made of a material such as Si, however, it is difficult to operate the driver circuit without causing the bipolar transistors to enter a saturated state at a low power-supply voltage such as 3.3V since a voltage in the range of 0.7V to 0.8V is required between the base and the emitter of each of the transistors.

Therefore, since it is difficult to apply the low power-supply voltage to the optical module for transmitting signals at high speed more than 2.5 Gbps, it is also difficult to make the power-supply voltage of the device 52 such as transmitting devices and routers low voltage.

In addition, since two power supplies are needed, one power supply for the logic circuit and the optical module for transmitting signals at low speed less than 600 Mbps and another power supply for the optical module for transmitting signals at high speed more than 2.5 Gbps, the device size become large.

SUMMARY

It is thus an object of the present invention to provide a low-cost and high-speed driver circuit capable of generating an output current signal or an output voltage signal with a desired amplitude by using a pair of non-complementary bipolar transistors made of a low-cost material such as Si without causing the bipolar transistors to enter a saturated state at a low power-supply voltage such as 3.3V.

It is another object of the present invention to provide an optical-transmission module capable of transmitting data by driving a laser diode or an optical modulator to generate an optical-transmission wave from an optical-transmission signal and operable with the same low power-supply voltage of the logic circuit and the optical module for transmitting signals at low speed less than 600 Mbps by using the low-cost driver circuit operable at a low power-supply voltage such as 3.3V.

In order to achieve the objects described above, a driver circuit is provided comprising a first differential-amplifier circuit having a pair of first transistors with emitters thereof connected to each other and a first resistor provided between an emitter connection point of the first transistors and first power supply. A difference in electric potential is applied between bases of the pair of the first transistors to set a ratio of a current flowing through one of the pair of the first transistors to a current flowing through the other first transistor at about $\frac{1}{100}$ or smaller, and an amplitude of an output current is controlled by a higher electric potential applied to the base of one of the first transistors.

Another driver circuit in accordance with the present invention comprises a first differential-amplifier circuit composed of a pair of first transistors employing bipolar transistors with emitters thereof connected to each other and a first resistor with resistance in the range of about 2 to 20 Ω provided between an emitter connection point of the pair of the first transistors and a first power supply, wherein an amplitude of an output current is controlled by electric potential.applied to a base of the first transistor.

An optical-transmission module in accordance with the present invention comprises a driver circuit having a first differential-amplifier circuit, the first differential-amplifier circuit having a pair of first transistors with emitters thereof connected to each other and a first resistor provided between an emitter connection point of the first transistors and a first power supply, with a difference in electric potential applied between bases of the pair of the first transistors to set a ratio of a current flowing through one of the pair of the first transistors to a current flowing through the other first transistor at about 1/100 or smaller, and a laser-diode module for outputting an optical-transmission wave by carrying out optical-intensity modulation on a laser diode on a basis of an output current signal or an output voltage signal output by the first differential-amplifier circuit, wherein an output current of the driver circuit is controlled by a higher electric potential applied to the base of one of the first transistors.

Another optical-transmission module in accordance with the present invention comprises a driver circuit having a first differential-amplifier circuit, the first differential-amplifier circuit having a pair of first transistors with emitters thereof connected to each other and a first resistor with resistance in the range of about 2 to 20 Ω provided between an emitter connection point of the pair of the first transistors and a first power supply, and a laser-diode module for outputting an optical-transmission wave by carrying out optical-intensity modulation on a laser diode on a basis of an output current signal or an output voltage signal output by the first differential-amplifier circuit, wherein an output current of the driver circuit is controlled by electric potential applied to a base of the first transistor.

Another optical-transmission module in accordance with the present invention comprises a driver circuit having a first differential-amplifier circuit, the first differential-amplifier circuit having a pair of first transistors with emitters thereof connected to each other and a first resistor provided between an emitter connection point of the first transistors and a first power supply, with a difference in electric potential applied between bases of the pair of the first transistors to set a ratio of a current flowing through one of the pair of the first transistors to a current flowing through the other first transistor at about 1/100 or smaller, and an optical-modulation module for outputting an optical-transmission wave by modulating a light emitted by a light source on the basis of an output current signal or an output voltage signal output by said first differential-amplifier circuit, wherein an output current of the driver circuit is controlled by a higher electric potential applied to the base of one of the first transistors.

Another optical-transmission module in accordance with the present invention comprises a driver circuit having a first differential-amplifier circuit, the first differential-amplifier circuit having a pair of first transistors with emitters thereof connected to each other and a first resistor with resistance in the range of about 2 to 20 Ω provided between an emitter connection point of the pair of the first transistors and a first power supply, and a optical-modulation module for outputting an optical-transmission wave by modulating a light emitted by a light source on the basis of an output current signal or an output voltage signal output by said first differential-amplifier circuit, wherein an output current of the driver circuit is controlled by electric potential applied to a base of the first transistor.

Another driver circuit in accordance with the present invention comprises a differential-amplifier circuit having a pair of transistors, means for setting a ratio of a current flowing through one of a pair of transistors to a current flowing through the other transistor at about 1/100 or smaller, and means for controlling the amplitude of an output current by the higher electric potential applied to said base of one of said transistors.

Another optical-transmission module in accordance with the present invention comprises a first optical module to transmit signals at low speed, a second optical module to transmit signals at high speed, and a power supply to supply substantially the same power supply voltage to both the first optical module and the second optical module.

Another optical-transmission module in accordance with the present invention comprises a driver circuit having a differential-amplifier circuit with a pair of transistors and means for setting a ratio of a current flowing through one of a pair of transistors to a current flowing through the other transistor at about 1/100 or smaller and means for controlling the amplitude of an output current by the higher electric potential applied to said base of one of said transistors, and a optical-modulation module for outputting an optical-transmission wave by modulating a light emitted by a light source on the basis of an output current signal or an output voltage signal output by said differential-amplifier circuit, wherein an output current of the driver circuit is controlled by electric potential applied to a base of the transistor.

As described above, in the driver circuits with the configurations explained above, the amplitude of an output can be increased by a difference in voltage between the base and the emitter of a transistor. As a result, it is possible to employ bipolar transistors made of a low-cost material such as Si in a driver circuit having the amplitude of an output signal at least equal to that of a driver circuit having a differential-amplifier circuit employing a pair of FETs each made of GaAs and the related art constant-current supply.

In addition, in optical-transmission modules having configurations described above, it is possible to transmit data by driving a laser diode or an optical modulator by means of the low-cost driver circuit described above to generate an optical-transmission wave with an improved quality.

DETAILED DESCRIPTION

The following description explains preferred embodiments of the present invention implementing a driver circuit capable of generating an output with a large amplitude from a low power-supply voltage by employing bipolar transistors, and a method for setting the amplitude of an output of the driver circuit and an optical-transmission module employing the driver circuit with reference to diagrams.

Figure 1:
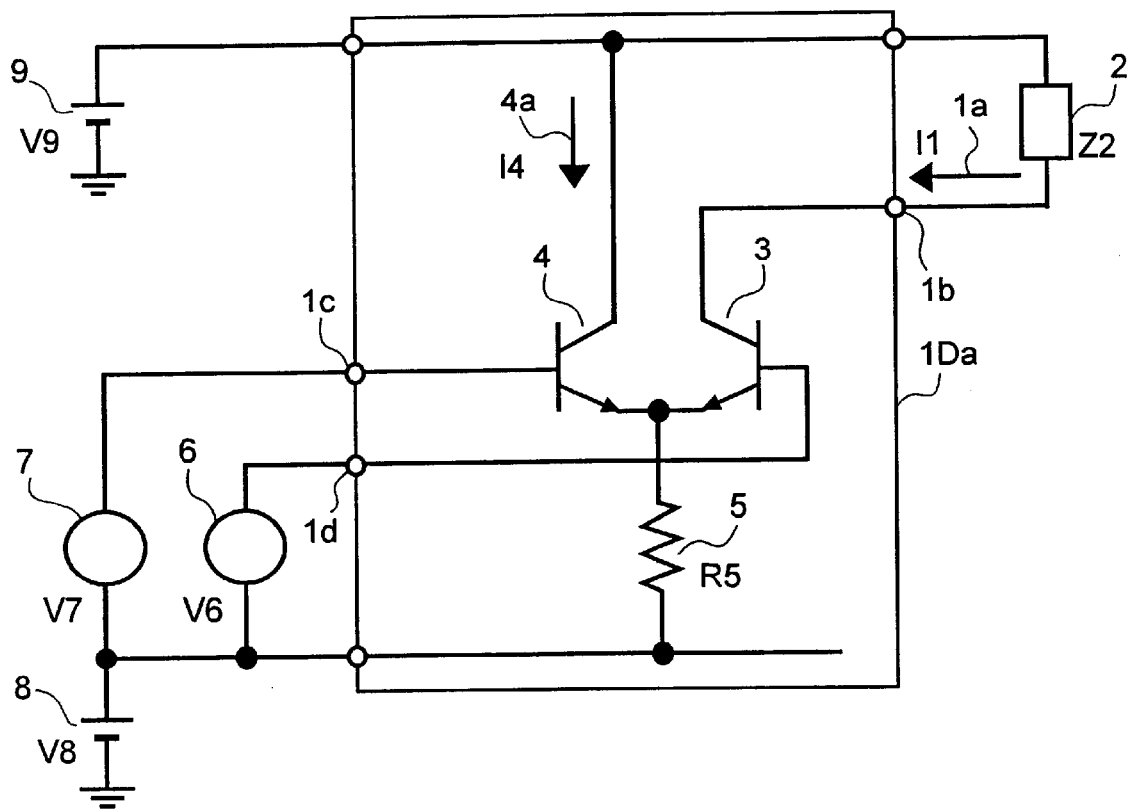
FIG. 1 is a circuit diagram showing a first embodiment of the present invention implementing a driver circuit.
Figure 2:
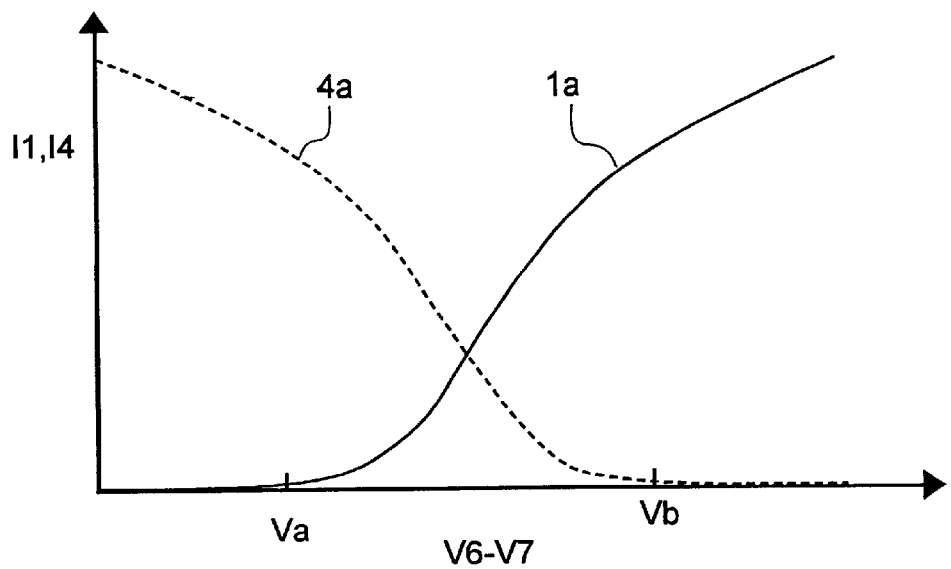
FIG. 2 is a diagram showing input/output characteristics of the driver circuit shown in FIG. 1.
Figure 11:
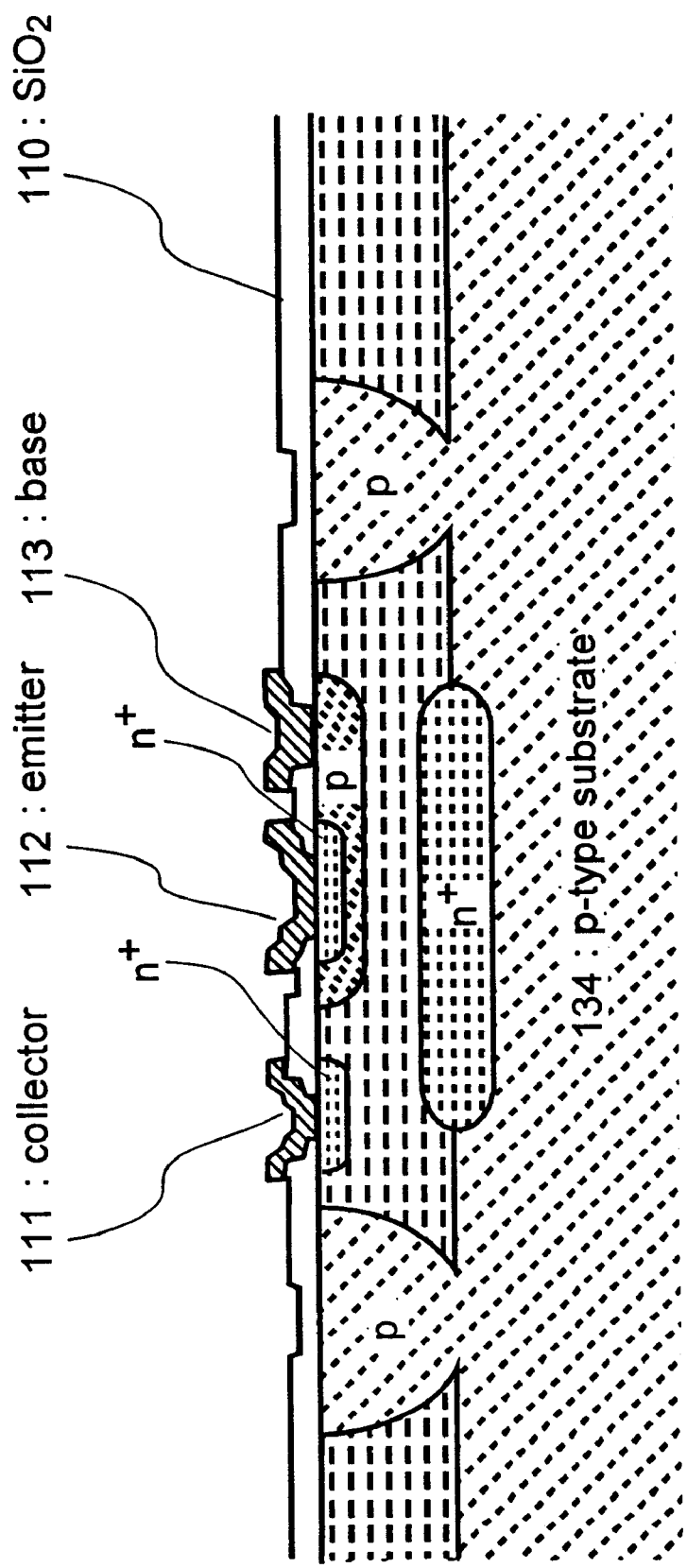
FIG. 11 is a cross-sectional diagram showing the structure of an embodiment implementing an NPN bipolar transistor provided by the present invention.

The description begins with an explanation of a first embodiment of the present invention implementing a driver circuit capable of generating an output with a large amplitude from a low power-supply voltage by employing bipolar transistors with reference to FIGS. 1 and 2. FIG. 1 is a circuit diagram showing the first embodiment of the present invention implementing a driver circuit. As shown in FIG. 1, the driver circuit 1D$a$ comprises a pair of bipolar transistors 3 and 4 with their emitters connected to each other to form a differential-amplifier circuit. A resistor 5 having a resistance in the range of about 2 to 20 Ω is provided between the emitter connection point of the transistors 3 and 4 and a power supply 8. The driver circuit 1D$a$ drives a load 2. Each of the transistors 3 and 4 is an NPN bipolar transistor which is made of a low-cost material such as Si and has a typical structure shown in FIG. 11. As shown in FIG. 11, an NPN bipolar transistor comprises a p layer, an n layer and an embedded n+layer which are provided on a p-type substrate 134. In addition, the NPN bipolar transistor also has a p layer connected to a base 113, an n+ layer connected to an emitter 112 and an n+ layer connected to a collector 111. In order to operate the transistor, a high voltage in the range of 0.7V to 0.8V is required to apply between the base 113 and the emitter 112. It should be noted that reference numeral 110 denotes an oxide film made of SiO2.

Next, the operation of the driver circuit 1D$a$ is explained by referring to FIG. 2.

FIG. 2 is a diagram showing input/output characteristics of the driver circuit 1D$a$. The solid line represents an output current 1$a$ of the driver circuit 1D$a$ which is denoted by a symbol I1. On the other hand, the dotted line represents a collector current 4$a$ of the transistor 4 which is denoted by a symbol I4. The output current 1$a$ of the driver circuit 1D$a$ which is denoted by a symbol I1 increases as a voltage difference (V6−V7) rises where the symbol V6 denotes an input voltage 6 and the symbol V7 denotes an input voltage 7. For a voltage difference (V6−V7) between V6 denoting the input voltage 6 and V7 denoting the input voltage 7 equal to or greater than Vb, the value I1 of the output current 1$a$ is given by Eq. (1) shown below. It should be noted that Vb is a level of the voltage difference (V6−V7) at which the collector current 4$a$ of the transistor 4 becomes equal to about 1/100 or less of the collector current 1$a$ of the transistor 3.

$$I1 \approx (V6 - Vbe3)/R5 \qquad (1)$$

where the symbol Vbe3 is a voltage between the base and the emitter of the transistor 3 and the symbol R5 is the resistance of the resistor 5.

Thus, the amplitude of the current I1 of the driver circuit 1D$a$ is determined by the higher one of the base electric potentials V6 and V7 of the transistors 3 and 4, respectively at a level of the voltage difference (V6−V7) at which the current flowing to one of the transistors 3 and 4 becomes equal to about 1/100 or less of the current flowing to the other transistor. To be more specific, the amplitude of the output current I1 provided by the collector of the transistor 3 is controlled by the base electric potential V6 of the transistor 3 which is higher than the base electric potential V7 of the transistor 4 at a level of the voltage difference (V6−V7) at which the current I4 flowing to the transistor 4 becomes equal to about 1/100 or less of the current I1 flowing to the other transistor I3.

Next, the characteristics of the driver circuit 1D$a$ are explained by comparing the characteristics with those of the related art driver circuit 10.

Figure 13:
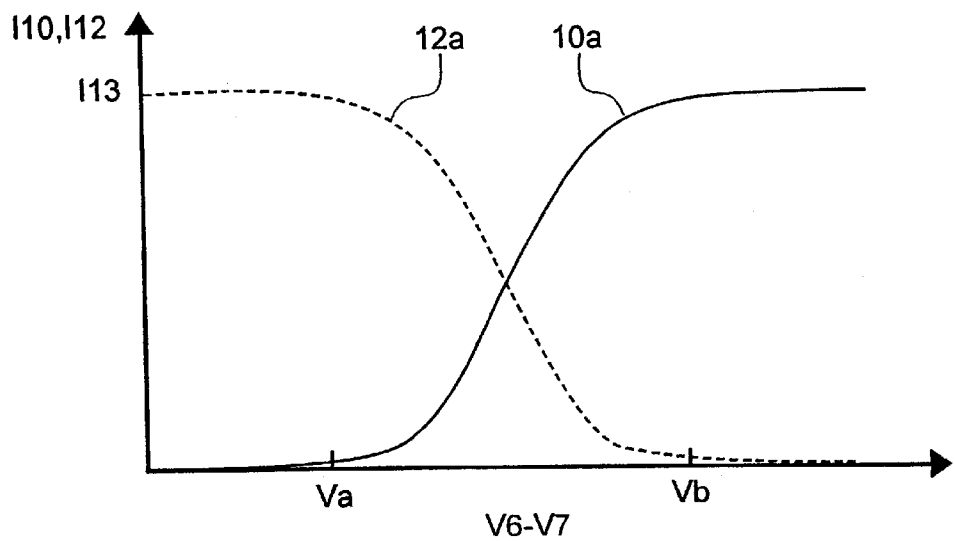
FIG. 13 is a diagram showing input/output characteristics of the related art driver circuit shown in FIG. 12.
Figure 14:
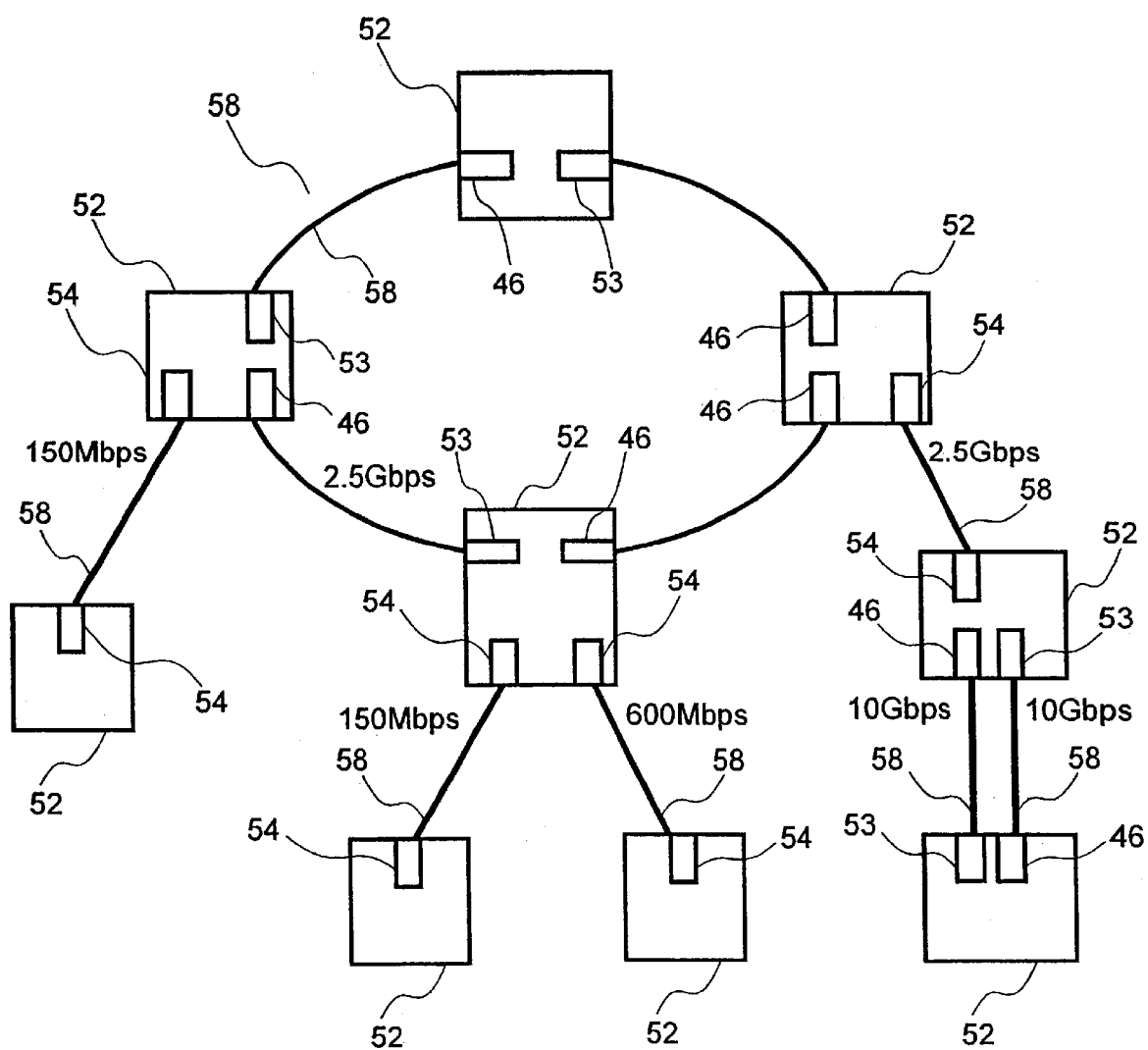
FIG. 14 is a diagram showing a typical related art network studied by the inventors in developing the present invention.
Figure 15:
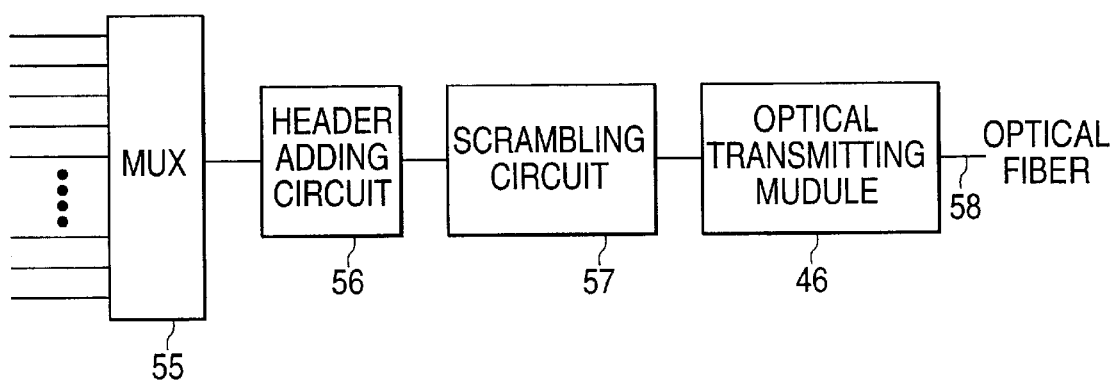
FIG. 15 is a block diagram showing an optical transmitting circuit.

FIG. 13 is a diagram showing input/output characteristics of the related art driver circuit 10. The solid line represents an output current 10$a$ of the driver circuit 10 which is denoted by a symbol I10. On the other hand, the dotted line represents a collector current 12$a$ of the transistor 12 which is denoted by a symbol I12. The output current 10$a$ of the driver circuit 10 which is denoted by a symbol I10 increases as a voltage difference (V6−V7) rises where the symbol V6 denotes an input voltage 6 and the symbol V7 denotes an input voltage 7. For a voltage difference (V6−V7) between V6 denoting the input voltage 6 and V7 denoting the input voltage 7 equal to or greater than Vb, the current value I10 of the output current 10$a$ becomes about equal to a value I13 of a current 13$a$ output by the constant-current supply circuit 13. It should be noted that Vb is a level of the voltage difference (V6−V7) at which the collector current 12$a$ of the transistor 12 becomes equal to about 1/100 or less of the collector current 10$a$ of the transistor 11.

Thus, the amplitude of the current output by the driver circuit 10 is determined by the current value I13 of the current 13$a$ output by the constant-current supply circuit 13 and controlled by changing the voltage generated by the voltage supply 14 at a level of the voltage difference (V6−V7) at which the current flowing to one of the pair of transistors 11 and 12 becomes equal to about 1/100 or less of the current flowing to the other transistor or smaller.

From the above explanation, the characteristic of the driver circuit 1D$a$ provided by the present invention as shown in FIG. 1 can be described as below in comparison with the characteristics of the related art driver circuit 10 shown in FIG. 12.

There is determined to be a maximum value of a current flowing through the load 2. By keeping the current flow below this maximum level it is possible to keep the operating speed of the transistor of the differential-amplitude circuit from decreasing and also to prevent entering a saturated state which causes the possibility of a latch-up malfunction being generated.

A maximum current value I1max of the current 1$a$ output by the driver circuit 1D$a$ provided by the present invention is expressed by Eq. (2) as follows:

$$I1\max = (V9 - V8 - Vbe3)/(Z2 + R5) \qquad (2)$$

where the symbols V9 and V8 denote electric potentials of the power supplies 9 and 8, respectively. The symbol Vbe3 denotes a voltage between the base and the emitter of the transistor 3, the symbol Z2 denotes the impedance of the load 2 and the symbol R5 denotes the resistance of the resistor 5.

On the other hand, a maximum current value I10max of the current 10a output by the related art driver circuit 10 provided by the present invention is expressed by Eq. (3) as follows:

$$I10\text{max}=(V9-V8-Vbe11-Vbe15)/(Z2+R16) \quad (3)$$

where the symbols V9 and V8 denote electric potentials of the power supplies 9 and 8, respectively. The symbol Vbe11 denotes a voltage between the base and the emitter of the GaAs FET 11, the symbol Vbe15 denotes a voltage between the base and the emitter of the GaAs FET 15, the symbol Z2 denotes the impedance of the load 2 and the symbol R16 denotes the resistance of the resistor 16.

A comparison of Eq. (2) with Eq. (3) indicates that, when compared with the related art driver circuit 10 with the same power-supply voltages, if a voltage Vbe11 between the base and the emitter of the GaAs FET 11 is equal to the voltage Vbe3 between the base and the emitter of the transistor 3 and if a resistance R16 of the resistor 16 is equal to the resistance R5 of the resistor 5, the driver circuit 1Da provided by the present invention is capable of flowing a current greater than the current generated by the driver circuit 10 of FIG. 12 by as much as ΔI obtained by Eq. (4) as follows:

$$\Delta I=Vbe15/(Z2+R5) \quad (4)$$

It should be noted that, while the collector of the transistor 4 is connected directly to the power supply 9 as shown in FIG. 1, a resistor may be connected between the collector of the transistor 4 and the power supply 9.

In addition, while NPN transistors are employed in the driver circuit 1Da shown in FIG. 1 as the transistors 3 and 4, PNP transistors may also be used.

As described above, by setting the resistance of the resistor 5 of the driver circuit 1Da employing the bipolar transistors as shown in FIG. 1 at a value in the range of about 2 to 20 Ω, the characteristics shown in FIG. 2 can be obtained. The characteristics indicate that a large output current I1 can be generated in comparison with the ordinary differential amplifier (or the driver circuit) 10 of FIG. 12 having the same power-supply voltages V9 and V8. And the same output current I1 in comparison with the ordinary differential amplifier (or the driver circuit) 10 of FIG. 12 can be generated with lower power-supply voltages V9 and V8 than the ordinary differential amplifier (or the driver circuit) 10 of FIG. 12.

In addition, when the driver circuit 1Da shown in FIG. 1 is applied to an optical-transmission module employing an LD (laser diode) as will be described later, an operation in a higher ambient temperature range is possible since a larger current can flow to the LD. That is to say, at a high temperature, it is necessary to flow a larger current into the LD for generating a larger optical output.

Furthermore, when the driver circuit 1Da shown in FIG. 1 is applied to an optical-transmission module employing an LD (laser diode) as will be described later, a damping resistor 48 having a higher resistance can be connected between the driver 1Da and the LD to generate the same current. As a result, the quality of the optical-transmission wave can be improved.

Furthermore, when the driver circuit 1Da shown in FIG. 1 is applied to an optical-transmission module employing an LD (laser diode) as will be described later, the power supply voltage of the driver circuit 1Da can be reduce to generate the same current when the same damping resistor 48 is used. As a result, the power supply voltage of the optical module can be reduced.

Figure 3:
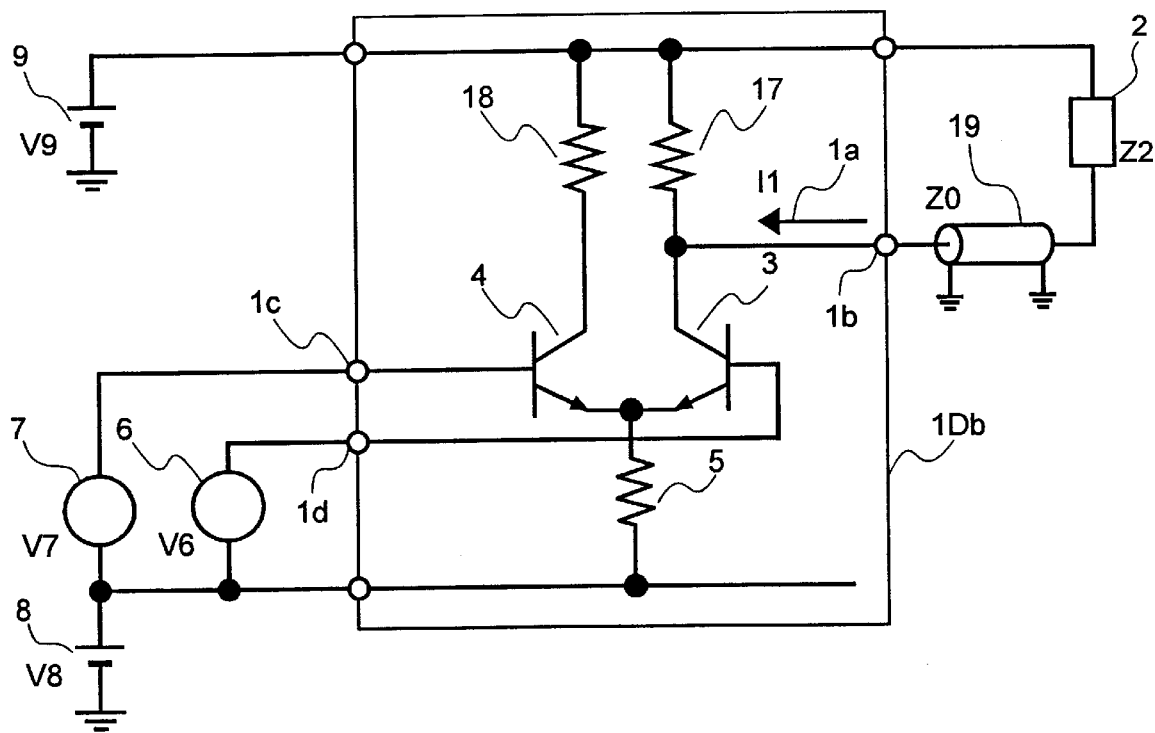
FIG. 3 is a circuit diagram showing a second embodiment of the present invention implementing a driver circuit.

The following description explains a second embodiment of the present invention implementing a driver circuit employing bipolar transistors to generate an output with a large amplitude from a low power-supply voltage with reference to FIG. 3. FIG. 3 is a circuit diagram showing the second embodiment implementing the driver circuit provided by the present invention. As shown in FIG. 3, the driver circuit 1Db comprises a pair of bipolar transistors 3 and 4 described above with their emitters connected to each other to form a differential-amplifier circuit. Resistors 17 and 18 are connected to the collectors of the transistors 3 and 4 respectively. A resistor 5 having a lowered resistance in the range of about 2 to 20 Ω is provided between the emitter connection point of the transistors 3 and 4 and a power supply 8. The driver circuit 1Db drives a load 2.

By setting the resistance of the resistor 17 at a value equal to the characteristic impedance Z0 of a transmission line 19 connecting the driver circuit 1Db to the load 2, it is possible to reduce the number of multiple reflections occurring between the driver circuit 1Db and the load 2, and hence to improve the quality of the optical-transmission waveform. In addition, by connecting the resistor 17 between the collector of the transistor 3 and the power supply 9, it is possible to control the amplitude of a voltage output from the collector of the transistor 3 by the electric potential V6 at the base of the transistor 3 which is higher than that of the transistor 4.

It should be noted that, while the resistor 18 is connected to the transistor 4 as shown in FIG. 3, the resistor 18 can be omitted.

In addition, while NPN transistors are employed in the driver circuit 1Db shown in FIG. 3 as the transistors 3 and 4, PNP transistors may also be used.

Like the driver circuit 1Da shown in FIG. 1, by lowering the resistance of the resistor 5 of the driver circuit 1Db employing the bipolar transistors as shown in FIG. 3 to a value in the range of about 2 to 20 Ω as described above, the characteristics shown in FIG. 2 can be obtained. The characteristics indicate that a large output current I1 can be generated in comparison with the ordinary differential amplifier (or the driver circuit) 10 of FIG. 12 when having the same power-supply voltages V9 and V8. In addition, it is possible to reduce the number of multiple reflections occurring between the driver circuit 1Db and the load 2, and hence to improve the quality of the waveform.

Furthermore, when the driver circuit 1Db is applied to an optical-transmission module employing an LD (laser diode) as will be described later, the same effect as the driver circuit 1Da can be obtained.

Furthermore, when the driver circuit 1Db is applied to an optical-transmission module employing an EA (electrical absorption), a larger modulation voltage can be set. As a result, optical characteristics can be improved.

Furthermore, when the driver circuit 1Db is applied to an optical-transmission module employing an EA (electrical absorption), the power supply voltage of the driver circuit can be reduced to generate the same modulation voltage. As a result, the power supply voltage of the optical module can be reduced.

Figure 4:
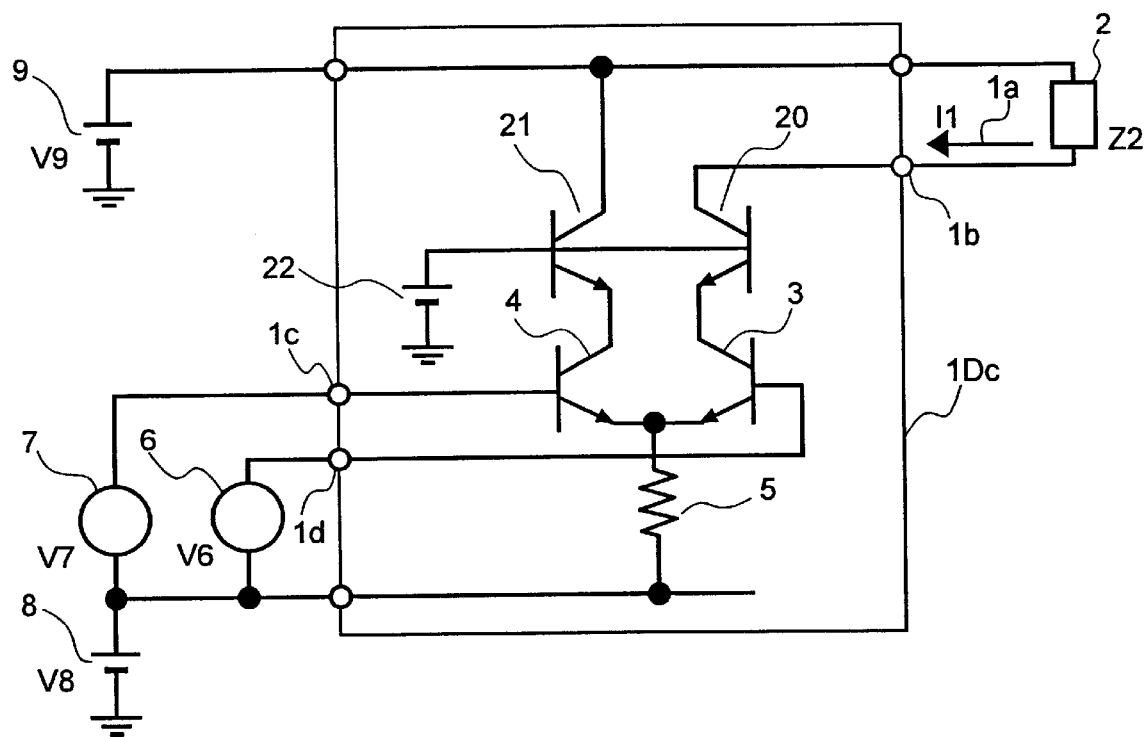
FIG. 4 is a circuit diagram showing a third embodiment of the present invention implementing a driver circuit.

The following description explains a third embodiment of the present invention implementing a driver circuit employing bipolar transistors to generate an output with a large amplitude from a low power-supply voltage with reference to FIG. 4. FIG. 4 is a circuit diagram showing the third embodiment implementing the driver circuit provided by the present invention. As shown in FIG. 4, the driver circuit 1Dc comprises a pair of bipolar transistors 3 and 4 described above with their emitters connected to each other to form a differential-amplifier circuit. A transistor 20 forming a grounded-base circuit is connected to the collector of the transistor 3. Similarly, a transistor 21 forming a grounded-base circuit is connected to the collector of the transistor 4. A resistor 5 having a lowered resistance in the range of about 2 to 20 Ω is provided between the emitter connection point of the transistors 3 and 4 and a power supply 8. The driver circuit 1Dc drives a load 2.

The transistor 20 forming a grounded-base circuit reduces a mirror capacitance which occurs between the base and the collector of the transistor 3. Similarly, the transistor 21 forming a grounded-base circuit reduces a mirror capacitance between the base and the collector of the transistor 4. As a result, the speed of the driver circuit 1Dc is increased.

It should be noted that, while the collector of the transistor 21 is connected directly to the power supply 9 as shown in FIG. 4, the collector of the transistor 21 can also be connected by a resistor to the power supply 9.

Similarly, the collector of the transistor 20 can also be connected by a resistor to the power supply 9 in the driver circuit 1Dc to provide a driver circuit similar to that shown in FIG. 3. In this case, by setting the resistance of the resistor connected between the collector of the transistor 20 and the power supply 9 at a value equal to the characteristic impedance Z0 of a transmission line 19 connecting the driver circuit 1Dc to the load 2, it is possible to reduce the number of multiple reflections occurring between the driver circuit 1Dc and the load 2, and hence to improve the quality of the waveform.

In addition, while NPN transistors are employed in the driver circuit 1Dc shown in FIG. 4 as the transistors 3 and 4, PNP transistors may also be used.

Much like the driver circuit 1Da shown in FIG. 1 and the driver circuit 1Db shown in FIG. 3, the driver circuit 1Dc allows the characteristics shown in FIG. 2 to be obtained. The characteristics indicate that a large output current I1 and output voltage can be generated in comparison with the ordinary differential amplifier (or the driver circuit) 10 of FIG. 12 when having the same power-supply voltages V9 and V8. In addition, it is possible to reduce a mirror capacitance between the base and the collector of the transistor 4. As a result, the speed of the driver circuit 1Dc is increased.

Furthermore, when the driver circuit 1Dc is applied to an optical-transmission module employing an LD (laser diode) as will be described later, the same effect as the driver circuits 1Da and 1Db can be obtained. Further, a much higher transmission speed can be implemented.

Figure 5:
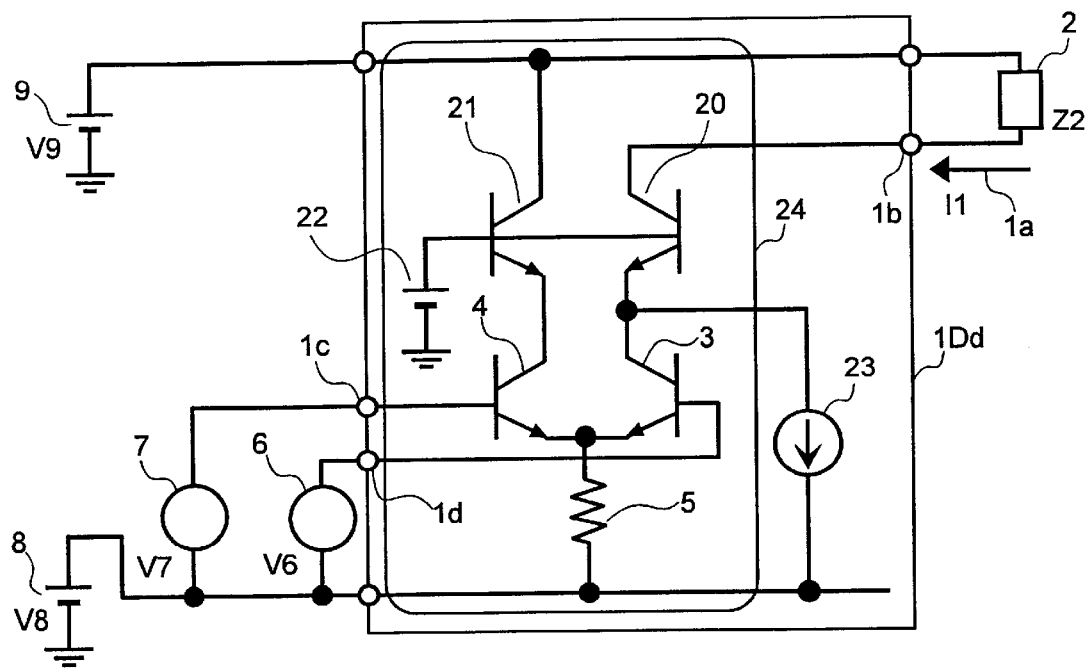
FIG. 5 is a circuit diagram showing a fourth embodiment of the present invention implementing a driver circuit.

The following description explains a fourth embodiment of the present invention implementing a driver circuit employing bipolar transistors to generate an output with a large amplitude from a low power-supply voltage with reference to FIG. 5. FIG. 5 is a circuit diagram showing the fourth embodiment implementing the driver circuit provided by the present invention. As shown in FIG. 5, the driver circuit 1Dd comprises a pair of bipolar transistors 3 and 4 described above with their emitters connected to each other to form a differential-amplifier circuit. A transistor 20 forming a grounded-base circuit is connected to the collector of the transistor 3. Similarly, a transistor 21 forming a grounded-base circuit is connected to the collector of the transistor 4. A resistor 5 having a resistance in the range of about 2 to 20 Ω is provided between the emitter connection point of the transistors 3 and 4 and a power supply 8. The driver circuit 1Dd also includes a constant-current supply circuit 23 connected to a connection point between the emitter of the transistor 20 forming a grounded-base circuit and the collector of the transistor 3 in the transistor pair. The driver circuit 1Dd drives a load 2.

By employing the constant-current supply circuit 23 in this way, the driver circuit 1Dd is capable of providing an offset current to the load 2.

In addition, by connecting the constant-current supply circuit 23 to a connection point between the emitter of the transistor 20 forming a grounded-base circuit and the collector of the transistor 3 which has relatively small voltage variations in the transistor pair resulting from changes in current flowing through the load 2, it is possible to reduce a decrease in operating speed of the driver circuit 1Dd caused by a parasitic capacitance of the constant-current supply circuit 23.

It should be noted that, while the collector of the transistor 21 is connected directly to the power supply 9 as shown in FIG. 5, the collector of the transistor 21 can also be connected by a resistor to the power supply 9.

In addition, in the driver circuit 1Dd, the collector of the transistor 20 can also be connected by a resistor to the power supply 9 as is the case with the driver circuit 1Db shown in FIG. 3. In this case, by setting the resistance of this resistor at a value equal to the characteristic impedance Z0 of a transmission line 19 connecting the driver circuit 1Dd to the load 2, it is possible to reduce the number of multiple reflections occurring between the driver circuit 1Dd and the load 2 and, hence, to improve the quality of the waveform.

In order to make a load borne by the transistor 4 equal to a load borne by the transistor 3, a constant-current supply circuit similar to the constant-current supply circuit 23 can also be connected to the transistor 4.

In addition, while NPN transistors are employed in the driver circuit 1Dd shown in FIG. 5 as the transistors 3 and 4, PNP transistors may also be used.

In comparison with the driver circuit 1Dc shown in FIG. 4, the driver circuit 1Dd explained above allows a bias current or a bias voltage to be applied to the load 2. In addition, by connecting the bias (constant-current supply) circuit 23 to an emitter of the grounded-base circuit composing the transistors 20 and 21 and a power supply 22, it is possible to reduce an effect of a parasitic capacitance of the bias circuit on the operating speed of the driver circuit 1Dd.

Further, by applying the driver circuit 1Dd to an optical-transmission module adopting EA (electronic absorption), it is possible to apply more modulation voltages and more bias voltages, and hence to improve the optical characteristics.

Figure 6:
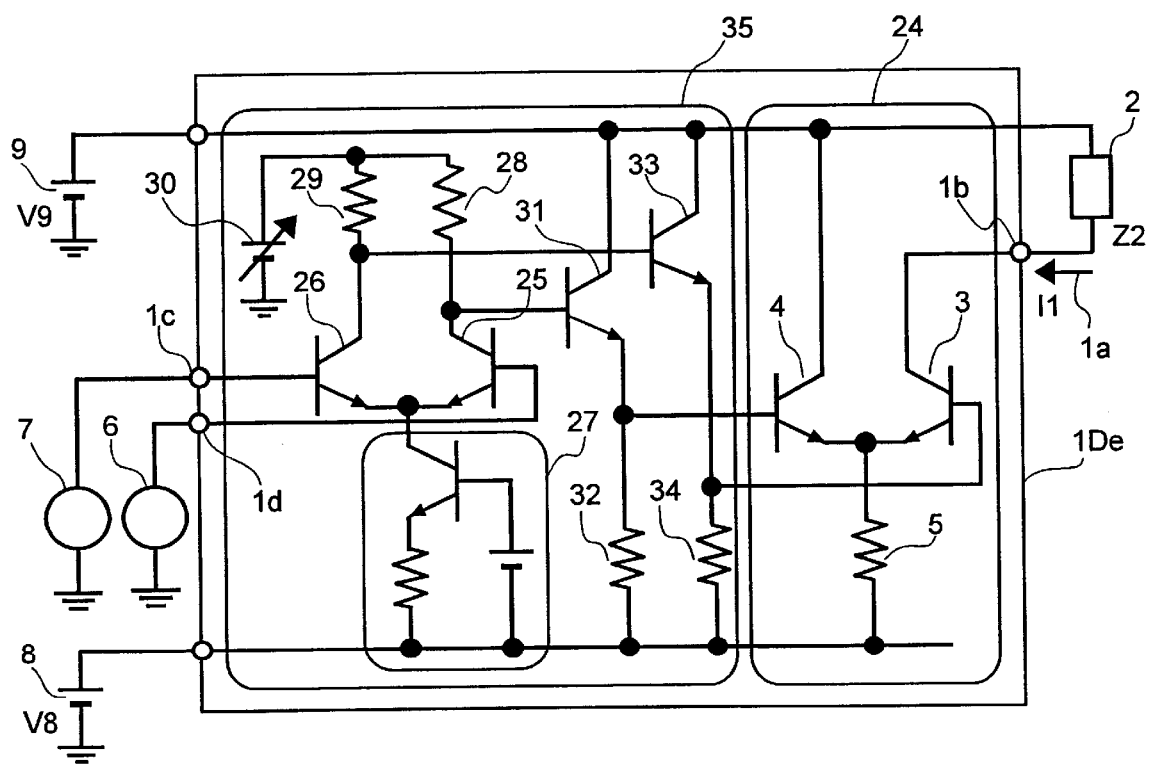
FIG. 6 is a circuit diagram showing a fifth embodiment of the present invention implementing a driver circuit.

The following description explains a fifth embodiment of the present invention implementing a driver circuit employing bipolar transistors to generate an output with a large amplitude from a low power-supply voltage with reference to FIG. 6. FIG. 6 is a circuit diagram showing the fifth embodiment implementing the driver circuit provided by the present invention. As shown in FIG. 6, the driver circuit 1De comprises a differential-amplifier circuit 24 and a preamplifier circuit 35, driving a load 2.

The differential-amplifier circuit 24 comprises a pair of bipolar transistors 3 and 4 with their emitters connected to each other, and a resistor 5 provided between the emitter connection point of the transistors 3 and 4 and a power supply 8.

On the other hand, the preamplifier circuit 35 comprises a differential-amplifier circuit and two emitter-follower circuits. The differential-amplifier circuit comprises a pair of bipolar transistors 25 and 26 with their emitters connected to each other, a constant-current supply circuit 27 provided between the emitter connection point of the transistors 25 and 26 and the power supply 8, a resistor 28 connected to the collector of the transistor 25, a resistor 29 connected to the collector of the transistor 26 and a variable power supply 30 connected to the other ends of the resistors 28 and 29. One of the emitter-follower circuits comprises a transistor 31 with the base thereof connected to the collector of the transistor 25 and a resistor 32 connected the emitter of the transistor 31 whereas the other emitter-follower circuit comprises a transistor 33 with the base thereof connected to the collector of the transistor 26 and a resistor 34 connected to the emitter of the transistor 33. It should be noted that the emitter of the transistor 31 is connected to the base of the transistor 4 employed in the differential-amplifier circuit 24 while the emitter of the transistor 33 is connected to the base of the transistor 3 employed in the differential-amplifier circuit 24.

The preamplifier circuit 35 allows the input voltages 6 and 7 of the driver circuit 1De to be kept at fixed values without regard to the amplitude of the current 1a output by the driver circuit 1De.

It should be noted that the differential-amplifier circuit 24 is not limited to the configuration shown in FIG. 6, but can also be implemented by the differential-amplifier circuits shown in FIGS. 3 to 5.

In addition, the resistor 32 employed in one of the emitter-follower circuits of the preamplifier circuit 35 besides the transistor 31 can be replaced by a constant-current supply circuit. Similarly, the resistor 34 employed the other emitter-follower circuit of the preamplifier circuit 35 besides the transistor 33 can be replaced by a constant-current supply circuit.

Furthermore, while NPN transistors are employed in the driver circuit 1De shown in FIG. 6, PNP transistors may also be used.

It is necessary to change the value of the input voltage on the Hi side in dependence on the value of the output current (or the output voltage) in the case of the driver circuits 1Da to 1Dd. In the case of the driver circuit 1De, on the other hand, the preamplifier circuit 35 allows the input voltages to be kept at fixed values. Thus, an output voltage of an ordinary digital IC which can not be changed can be applied to the driver circuit (driver IC) 1De as an input. In general, an ordinary digital IC outputs predetermined high and low voltages which cannot be changed.

In addition, the values of the output current and the output voltage of the driver circuit 1De can be changed all but proportionally to a voltage generated by the variable voltage supply 30. That is to say, control is easy to execute since there is no abrupt-change point.

Figure 7:
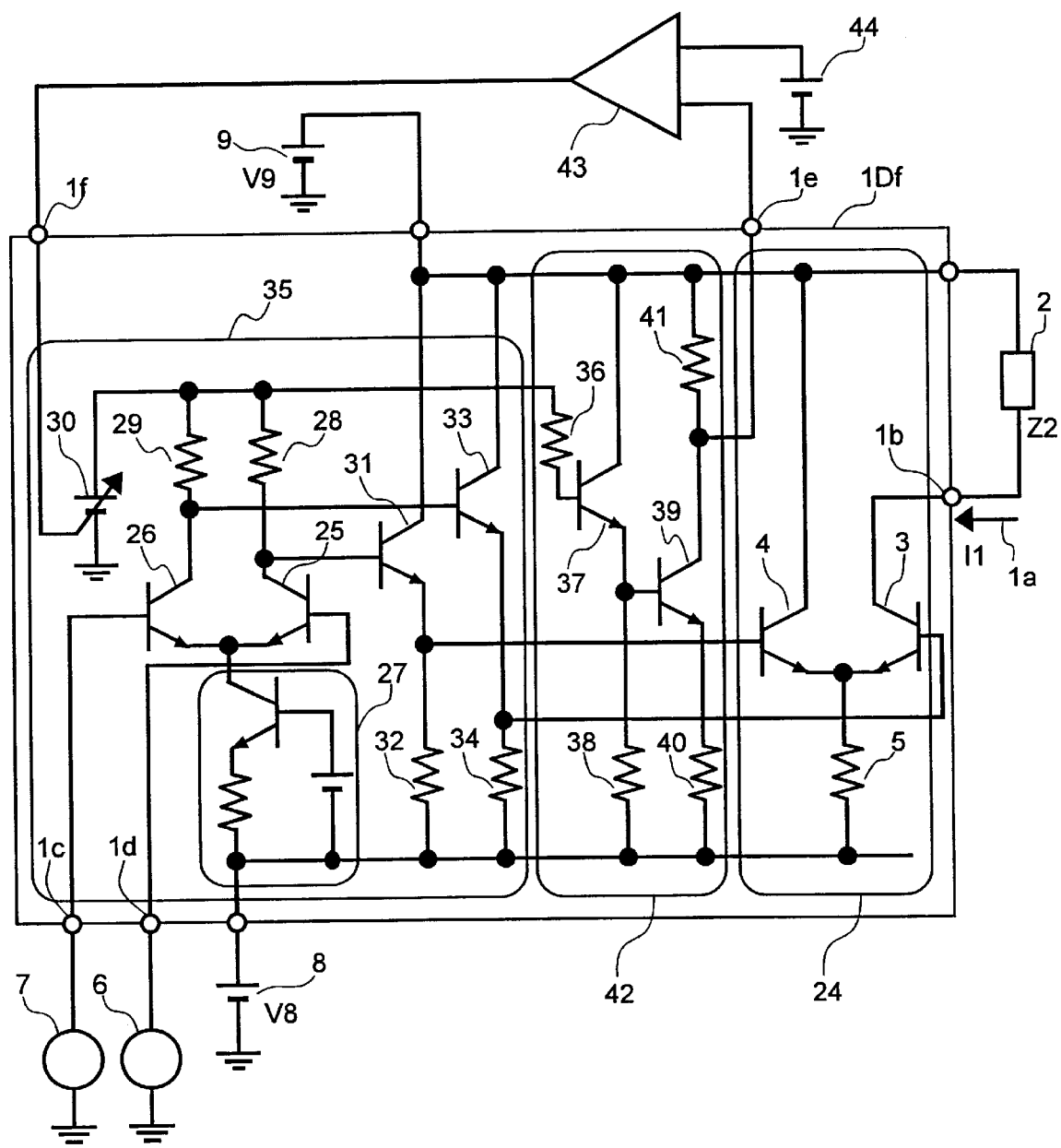
FIG. 7 is a circuit diagram showing a sixth embodiment of the present invention implementing a driver circuit.

The following description explains a sixth embodiment of the present invention implementing a driver circuit employing bipolar transistors to generate an output with a large amplitude from a low power-supply voltage with reference to FIG. 7. FIG. 7 is a circuit diagram showing the sixth embodiment-implementing the driver circuit provided by the present invention. As shown in FIG. 7, the driver circuit 1Df comprises a differential-amplifier circuit 24, a preamplifier circuit 35 and a monitor circuit 42 for driving a load 2.

The differential-amplifier circuit 24 comprises a pair of bipolar transistors 3 and 4 with their emitters connected to each other, and a resistor 5 provided between the emitter connection point of the transistors 3 and 4 and a power supply 8.

On the other hand, the preamplifier circuit 35 comprises a differential-amplifier circuit and two emitter-follower circuits. The differential-amplifier circuit comprises a pair of bipolar transistors 25 and 26 with their emitters connected to each other, a constant-current supply circuit 27 provided between the emitter connection point of the transistors 25 and 26 and the power supply 8, a resistor 28 connected to the collector of the transistor 25, a resistor 29 connected to the collector of the transistor 26 and a variable power supply 30 connected to the other ends of the resistors 28 and 29. One of the emitter-follower circuit comprises a transistor 31 with the base thereof connected to the collector of the transistor 25 and a resistor 32 connected to the emitter of the transistor 31 whereas the other emitter-follower circuit comprises a transistor 33 with the base thereof connected to the collector of the transistor 26 and a resistor 34 connected to the emitter of the transistor 33. It should be noted that the emitter of the transistor 31 is connected to the base of the transistor 4 employed in the differential-amplifier circuit 24 while the emitter of the transistor 33 is connected to the base of the transistor 3 employed in the differential-amplifier circuit 24.

Finally, the monitor circuit 42 comprises an emitter-follower circuit, a transistor 39 and resistors 40 and 41. The emitter-follower circuit comprises resistors 36 and 38, and a transistor 37. The resistor 36 is connected to the variable voltage supply 30 and has a resistance N times that of the resistor 29. The other end of the resistor 36 is connected to the base of the transistor 37 which has an emitter area 1/N times that of the transistor 33. Connected between the power supply 8 and the emitter of the transistor 37, the resistor 38 has a resistance N times that of the resistor 34. The output of the emitter-follower circuit is connected to the base of the transistor 39 which has an emitter area 1/N times that of the transistor 3. Connected between the power supply 8 and the emitter of the transistor 39, the resistor 40 has a resistance N times that of the resistor 5 which has a lowered resistance in the range of about 2 to 20 Ω. The resistor 41 is connected between the collector of the transistor 39 and the power supply 9.

The amplitude of the collector current of the transistor 39 employed in the monitor circuit 42 becomes equal to 1/N times that of the current 1a output by the driver circuit 1Df. Expressed by Eq. (5) below, the voltage V1m appearing at an amplitude monitor terminal 1e of the driver circuit 1Df can thus be treated as a monitored voltage representing the amplitude of the current 1a output by the driver circuit 1Df.

$$V1m = R41 \times I1m/N \tag{5}$$

where the symbol R41 denotes the resistance of the resistor 41 and the symbol I1m denotes the amplitude of the current 1a output by the driver circuit 1Df.

In addition, the difference between the voltage appearing at the amplitude monitor terminal 1e of the driver circuit 1Df and the stable voltage of a voltage supply 44 is amplified by a differential amplifier 43 to produce an output for controlling the voltage generated by the variable voltage supply 30 employed in the preamplifier circuit 35 of the driver circuit 1Df. As a result, the amplitude of the current 1a output by the driver circuit 1Df can be stabilized.

It should be noted that the differential-amplifier circuit 24 is not limited to the configuration shown in FIG. 7, but can also be implemented by the differential-amplifier circuits shown in FIGS. 3 to 5.

In addition, the resistor 32 employed in one of the emitter-follower circuits of the preamplifier circuit 35 besides the transistor 31 can be replaced by a constant-current supply circuit. Similarly, the resistor 34 employed the other emitter-follower circuit of the preamplifier circuit 35 besides the transistor 33 can be replaced by a constant-current supply circuit.

Furthermore, while NPN transistors are employed in the driver circuit 1Df shown in FIG. 7, PNP transistors may also be used.

As described above, the monitor circuit 42 employed in the driver circuit 1Df allows the current and voltage output by the driver circuit 1Df to be known without adversely affecting an output circuit. In order to observe the current and the voltage output by the driver circuit 1Df, a probe or an input terminal of a measurement apparatus can also be brought into electrical contact with the output of the driver circuit 1Df outputting a waveform which changes at a high speed. In this case, however, the quality of the waveform will deteriorate, adversely affecting the output circuit.

In addition, in the case of the driver circuit 1Df, the voltage output by the monitor circuit 42 is supplied to a circuit comprising the operational amplifier 43 and the voltage supply 44 to make the current and voltage output by the driver circuit 1Df more precise and more stable.

Further, since the voltage output by the monitor circuit 42 can be increased to a level in the range of 2 to 3V in the case of the driver circuit 1Df, the voltage generated by the voltage supply 44 can also be increased to a level in the range of 2 to 3V as well. As a result, the circuit comprising the operational amplifier 43 and the voltage supply 44 is hardly affected by noise. Furthermore, since a D/A (digital to analog) converter can be directly connected, the need for an amplifier circuit can be eliminated.

Figure 8:
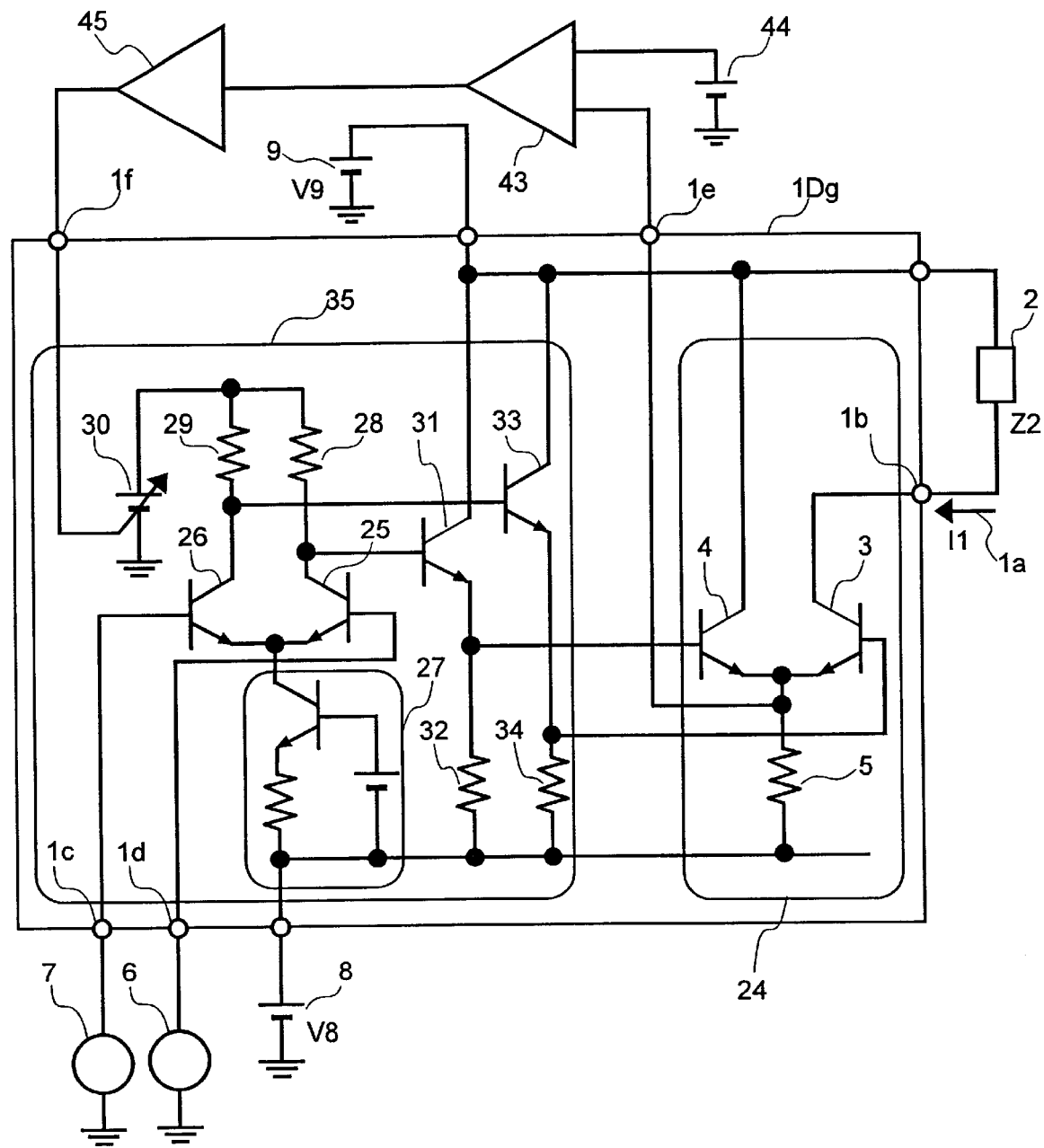
FIG. 8 is a circuit diagram showing a seventh embodiment of the present invention implementing a driver circuit.

The following description explains a seventh embodiment of the present invention implementing a driver circuit employing bipolar transistors to generate an output with a large amplitude from a low power-supply voltage with reference to FIG. 8. FIG. 8 is a circuit diagram showing the seventh embodiment implementing the driver circuit provided by the present invention. As shown in FIG. 8, the driver circuit 1Dg comprises a differential-amplifier circuit 24 and a preamplifier circuit 35 for driving a load 2.

The differential-amplifier circuit 24 comprises a pair of bipolar transistors 3 and 4 with their emitters connected to each other, and a resistor 5 provided between the emitter connection point of the transistors 3 and 4 and a power supply 8. The emitter connection point of the transistors 3 and 4 is used as an amplitude monitor terminal 1e of the driver circuit 1Dg.

On the other hand, the preamplifier circuit 35 comprises a differential-amplifier circuit and two emitter-follower circuits. The differential-amplifier circuit comprises a pair of bipolar transistors 25 and 26 with their emitters connected to each other, a constant-current supply circuit 27 provided between the emitter connection point of the transistors 25 and 26 and the power supply 8, a resistor 28 connected to the collector of the transistor 25, a resistor 29 connected to the collector of the transistor 26 and a variable power supply 30 connected to the other ends of the resistors 28 and 29 for controlling voltage. One of the emitter-follower circuits comprises a transistor 31 with the base thereof connected to the collector of the transistor 25 and a resistor 32 connected to the emitter of the transistor 31 whereas the other emitter-follower circuit comprises a transistor 33 with the base thereof connected to the collector of the transistor 26 and a resistor 34 connected to the emitter of the transistor 33. It should be noted that the emitter of the transistor 31 is connected to the base of the transistor 4 while the emitter of the transistor 33 is connected to the base of the transistor 3.

Expressed by Eq. (6) below, the voltage $V1m$ appearing at the amplitude monitor terminal 1e of the driver circuit 1Dg can thus be treated as a monitored voltage representing the amplitude of the current 1a output by the driver circuit 1Dg.

$$V1m = R5 \times I1m \quad (6)$$

where the symbol R5 denotes the resistance of the resistor 5 and the symbol $I1m$ denotes the amplitude of the current 1a output by the driver circuit 1Dg.

In addition, the difference between the voltage appearing at the amplitude monitor terminal 1e of the driver circuit 1Dg and the stable voltage of a voltage supply 44 is amplified by a differential amplifier 43 and the output of the differential amplifier 43 is inverted and amplified by an inverting amplifier 45 to produce an output for controlling the voltage generated by the variable voltage supply 30 employed in the preamplifier circuit 35 of the driver circuit 1Dg. As a result, the amplitude of the current 1a output by the driver circuit 1Dg can be stabilized.

It should be noted that the differential-amplifier circuit 24 is not limited to the configuration shown in FIG. 8, but can also be implemented by the differential-amplifier circuits shown in FIGS. 3 to 5.

In addition, the resistor 32 employed in one of the emitter-follower circuits of the preamplifier circuit 35 besides the transistor 31 can be replaced by a constant-current supply circuit. Similarly, the resistor 34 employed in the other emitter-follower circuit of the preamplifier circuit 35 besides the transistor 33 can be replaced by a constant-current supply circuit.

Furthermore, while NPN transistors are employed in the driver circuit 1Dg shown in FIG. 8, PNP transistors may also be used.

It The driver circuit 1Dg described above provides a simple IC circuit in comparison with the driver circuit 1Df shown in FIG. 7.

Figure 9:
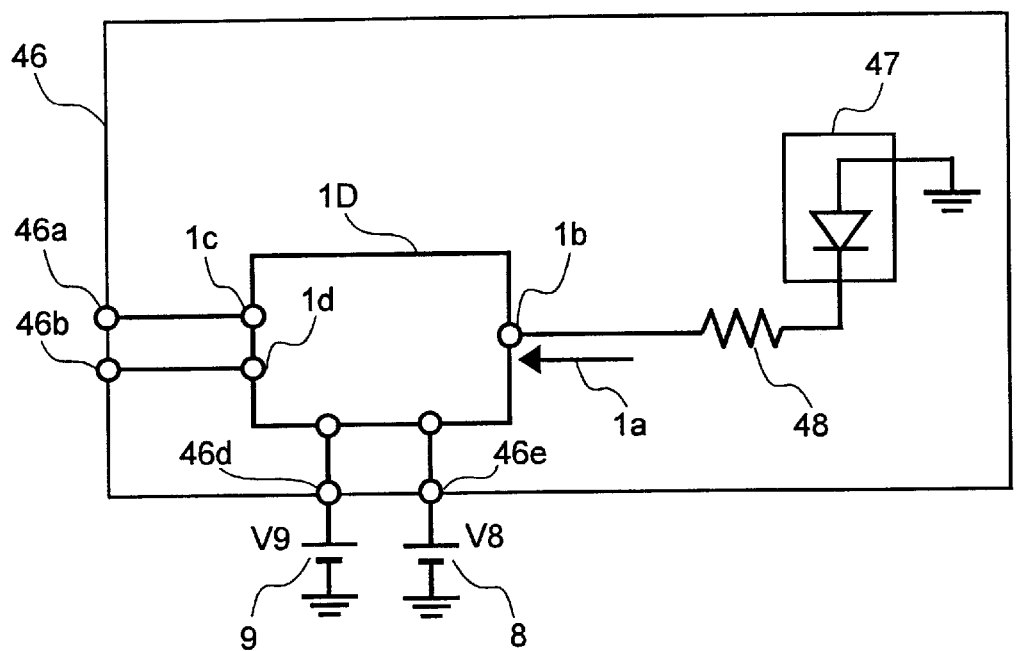
FIG. 9 is a block diagram showing a first embodiment implementing an optical-transmission module provided by the present invention.
Figure 10:
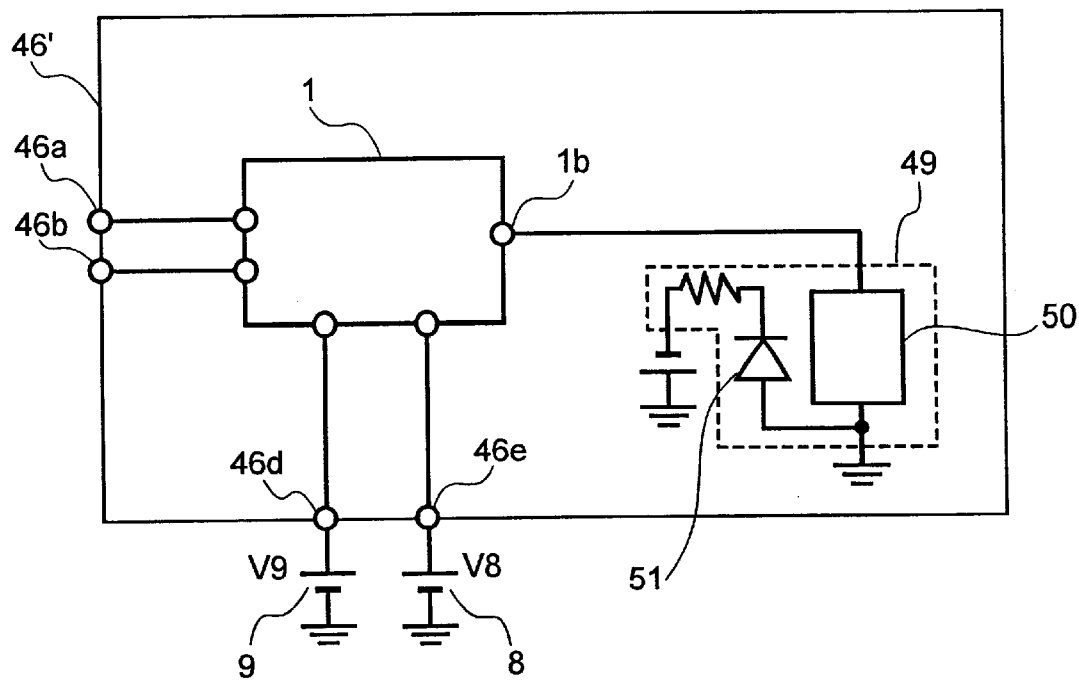
FIG. 10 is a block diagram showing a second embodiment implementing an optical-transmission module provided by the present invention.

Next, embodiments implementing an optical-transmission module provided by the present invention are explained by referring to FIGS. 9 and 10.

FIG. 9 is a block diagram showing a first embodiment implementing an optical-transmission module employing the driver circuit 1D provided by the present invention.

As shown in FIG. 9, the first embodiment implementing the optical-transmission module 46 comprises the driver circuit 1D, a laser diode module 47 and a resistor 48. The driver circuit 1D is a monolithic IC implementing part or all of any of the driver circuits 1Da through 1Dg shown in FIG. 1 and FIGS. 3 to 8, respectively. The laser diode module 47 is an implementation of a laser diode (including a photo diode) which is connected as the load 2 borne by the driver circuit 1D. Driven by a driving voltage or a driving current output by the driver circuit 1D, the laser diode module 47 generates an optical wave completing optical-intensity modulation. The resistor 48 damps ringing (distortion with an attenuated amplitude) of the current 1a output by the driver circuit 1D. The amplitude of the ringing is determined by the inductance of the laser diode module 47, a parasitic capacitance of the driver circuit 1D and a capacitance of a wire between the laser diode module 47 and the driver circuit 1D. Reference numeral 46d denotes a power-supply input terminal supplying a voltage V9 generated by a direct-current power supply 9 to the optical-transmission module 46 including the driver circuit 1D. Reference numeral 46 denotes a power-supply input terminal supplying a voltage V8 generated by a direct-current power supply 8 to the optical-transmission module 46. Reference numeral 46a denotes a signal input terminal connected to a terminal 1c of the driver circuit 1D. Typically, the signal input terminal 46a is used for supplying an encoded optical-transmission signal to the optical-transmission module 46 as a voltage signal V7. Likewise, reference numeral 46b denotes a signal input terminal connected to a terminal 1d of the driver circuit 1D. Similarly, the signal input terminal 46b is typically used for supplying an encoded optical-transmission signal to the optical-transmission module 46 as a voltage signal V6. By supplying two optical-transmission signals from the input terminals 46a and 46b in this way, it is possible to improve the precision of a signal output by the driver circuit 1D for carrying out optical-intensity modulation on the laser diode 47.

Nonetheless, only one optical-transmission signal can be supplied to the signal input terminal 46b. In this case, the interior of the optical-transmission module 46 or the driver circuit 1D needs to be configured so that the desired fixed voltage signal V7 is supplied to the driver circuit 1D by way of the terminal 1c from the power-supply voltages V8 and V9 supplied to the power-supply input terminals 46e and 46d respectively.

Figure 12:
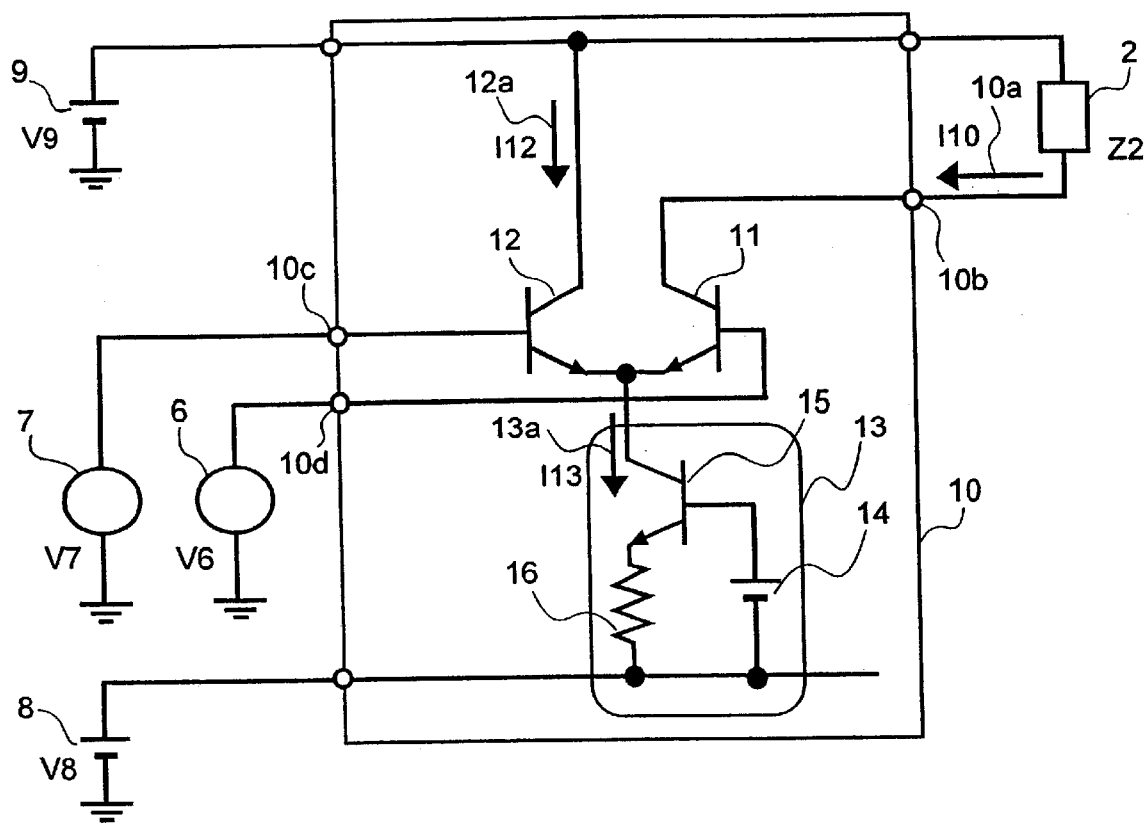
FIG. 12 is a circuit diagram showing a typical related art driver circuit studied by the inventors in developing the present invention.

As described above, by employing the driver circuit 1D in the optical-transmission module 46, in comparison with the related art driver circuit 10 shown in FIG. 12 driven by the same power-supply voltages, the range of a voltage appearing at the output terminal 1b can be made broader by a difference in voltage between the base and the emitter of the transistor 15 used in the constant-current supply circuit 13 employed in the related art driver circuit 10.

As a result, the magnitude of a current flowing through the laser diode module 47 can be increased by $\Delta I1m$ expressed by Eq. (7) below. In addition, the driver circuit 1D having a differential-amplifier circuit comprising bipolar transistors for inputting an optical-transmission signal from at least the signal input terminal 46b is thus capable of driving the laser diode module 47 and carrying out optical-intensity modulation on the laser diode module 47.

$$\Delta I1m = Vbe15/R15 \quad (7)$$

where the symbol Vbe15 denotes a voltage between the base and the emitter of the transistor 15 employed in the related art constant-current supply circuit 13 and the symbol R5 denotes the resistance of the resistor R5 having a lowered value in the range of about 2 to 20 Ω.

As described above, a current flowing through a laser diode 47 can be increased even if the temperature of the laser diode 47 rises by virtue of the optical-transmission module 46 employing a driver circuit 1D for driving the laser diode 47, wherein the driver circuit 1D comprises a pair of bipolar transistors 3 and 4 functioning as a differential-amplifier circuit and a resistor 5 having a lowered resistance. As a result, it is possible to carry out an optical transmission by using the laser diode 47 in a high temperature range.

In addition, since the resistance of the damping resistor 48 can be set at a higher value than that of the related art driver circuit 10 shown in FIG. 12, the amount of ringing of the current 1a output by the driver circuit 1D can be reduced, and the laser diode 47 can be driven into optical-intensity modulation with a high degree of precision. As a result, the quality of an optical waveform output by the optical-transmission module 46 can be improved.

It should be noted that the optical-transmission module 46 can also include the amplifier 43 and the inverting amplifier 45 for stabilizing the amplitude of the current 1a output by the driver circuit 1D as shown in FIG. 7 or 8.

FIG. 10 is a block diagram showing a second embodiment implementing an optical-transmission module employing the driver circuit 1D provided by the present invention.

As shown in FIG. 10, the second embodiment 46' implementing the optical-transmission module comprises the driver circuit 1D and an optical-modulation module 49. The driver circuit 1D is a monolithic IC implementing part or all of any of the driver circuits 1Da through 1Dg shown in FIG. 1 and FIGS. 3 to 8, respectively. On the other hand, the optical-modulation module 49 comprises a light source 51 such as a laser diode and an optical modulator 50. Driven by a driving voltage or a driving current output by the driver circuit 1D, the optical modulator 50 carries out optical modulation on a light emitted by the light source 51 to generate an optically modulated optical wave. In order to transmit information by using a light beam, the optical modulator 50 converts an electrical signal into changes in light-beam attributes such as intensity, amplitude, frequency, phase or polarization plane.

As described above, the second embodiment implementing the optical-transmission module is different from the first embodiment explained earlier in that, in the case of the second embodiment, the optical modulation module 49 comprising the light source 51 such as laser diode and the optical modulator 50 is employed in place of the laser-diode module 47 implementing a laser diode in the first embodiment.

In-addition, the first and second embodiment implementing the optical transmission module can share the same low power-supply voltage(V8, V9) of the logic circuit and the optical module for transmitting signals at low speed less than 600 Mbps(not shown in FIG. 9 and FIG. 10).

As described above, it is possible to implement the optical-transmission module 46 or 46' employing the driver circuit 1D for driving the laser diode 47 or the optical modulator 50, respectively as a low-cost optical-transmission module.

In addition, by mounting the driver circuit 1D implemented as a monolithic IC and the laser diode module 47 or the optical-modulation module 49 on a board, it is possible to implement a low-cost and small-size optical-transmission module 46 or 46' respectively.

According to the present invention, the amplitude of a current or a voltage output by a differential-amplifier circuit can be increased. As a result, there is exhibited an effect that it is possible to employ bipolar transistors made of a low-cost material such as Si in a differential-amplifier circuit to implement a low-cost driver circuit.

In addition, the present invention also exhibits an effect that it is possible to implement a low-cost optical-transmission module that is capable of transmitting data by driving a laser diode or an optical modulator by means of the low-cost driver circuit to generate an optical-transmission wave with an improved quality.

What is claimed is:

1. A driver circuit comprising a first differential-amplifier circuit having a pair of first transistors with emitters thereof connected to each other and a first resistor provided between an emitter connection point of the first transistors and a first power supply;

wherein a higher base voltage is applied to the base of one of the first transistors than a base voltage applied to the base of the other first transistor, and wherein, with a difference in electric potential applied by the base voltages between bases of the pair of the first transistors to set a ratio of a current flowing through one of the pair of the first transistors to a current flowing through the other first transistor at about $1/100$ or smaller, an amplitude of an output current of the driver circuit is controlled by the higher electric voltage applied to the base of one of the first transistors than to the base of the other first transistor.

2. A driver circuit comprising a first differential-amplifier circuit having composed of a pair of first transistors employing bipolar transistors with emitters thereof connected to each other and a first resistor with resistance in the range of about 2 to 20 Ω provided between an emitter connection point of the pair of the first transistors and first power supply;

wherein an amplitude of an output current of the driver circuit is controlled by electric potential applied to a base of at least one of the first transistors.

3. The driver circuit according to claim 1, wherein said first resistor's resistance is in the range of about 2 to 20 Ω.

4. The driver circuit according claim 1, wherein said first differential-amplifier circuit further comprises at least one second resistor provided between a collector of at least one of said first transistors and a second power supply.

5. The driver circuit according claim 2, wherein said first differential-amplifier circuit further comprises at least one second resistor provided between a collector of at least one said first transistors and a second power supply.

6. The driver circuit according claim 1, wherein said first differential-amplifier circuit further comprises a pair of grounded-base second transistors, wherein emitters of the grounded-base second transistors are connected to collectors of said first transistors.

7. The driver circuit according claim 2, wherein said first differential-amplifier circuit further comprises a pair of grounded-base second transistors, wherein emitters of the grounded-base transistors are connected to collectors of said first transistors.

8. The driver circuit according claim 6, wherein said first differential-amplifier circuit further comprises a constant-current supply circuit connected to one of connection points between said emitters of said grounded-base second transistors and said collectors of said first transistors.

9. The driver circuit according to claim 7, wherein said first differential-amplifier circuit further comprises a constant-current supply circuit connected to one of connection points between said emitters of said grounded-base second transistors and said collectors of said first transistors.

10. The driver circuit according to claim 1, wherein the driver circuit further comprises a preamplifier circuit connected to said bases of said first transistors, wherein the preamplifier circuit has preamplifier voltage supply, and wherein an amplitude of a current or a voltage outputted from said first differential-amplifier circuit is controlled by an electric potential of the preamplifier voltage supply.

11. The driver circuit according to claim 2, wherein the driver circuit further comprises a preamplifier circuit connected to said bases of said first transistors, wherein the preamplifier circuit has a preamplifier voltage supply, and wherein an amplitude of a current or a voltage outputted from said first differential-amplifier circuit is controlled by an electric potential of the preamplifier voltage supply.

12. The driver circuit according to claim 10, wherein the preamplifier circuit comprises a second differential-amplifier circuit and a pair of emitter-follower circuits, wherein the second differential-amplifier circuit has a pair of third transistors with emitters thereof connected to each other and a constant-current supply circuit connected to the emitters of the third transistors, wherein collectors of the pair of the third transistors are connected to said preamplifier voltage supply and the pair of emitter-follower circuits, and wherein emitters of the emitter-follower circuits are connected to said bases of first transistors.

13. The driver circuit according to claim 11, wherein the preamplifier circuit comprises a second differential-amplifier circuit and a pair of emitter-follower circuits, wherein the second differential-amplifier circuit has a pair of third transistors with emitters thereof connected to each other and a constant-current supply circuit connected to the emitters of the third transistors, wherein collectors of the pair of the third transistors are connected to said preamplifier voltage supply and the pair of emitter-follower circuits, and wherein emitters of the emitter-follower circuits are connected to said bases of first transistors.

14. The driver circuit according to claims 1, wherein the driver circuit further comprising a monitor circuit for monitoring the amplitude of a current output by said first differential-amplifier circuit.

15. The driver circuit according to claims 2, wherein the driver circuit further comprising a monitor circuit for monitoring the amplitude of a current output by said first differential-amplifier circuit.

16. The driver circuit according to claim 10, wherein the driver circuit further comprising a monitor circuit for monitoring the amplitude of a current output by said first differential-amplifier circuit, and wherein the electric potential of said voltage supply is controlled in accordance with the amplitude of said output current monitored by said monitor circuit.

17. The driver circuit according to claim 11, wherein the driver circuit further comprising a monitor circuit for monitoring the amplitude of a current output by said first differential-amplifier circuit, and wherein the electric potential of said voltage supply is controlled in accordance with the amplitude of said output current monitored by said monitor circuit.

18. An optical-transmission module comprising:

a first differential-amplifier circuit having a pair of first transistors with emitters thereof connected to each other and a first resistor provided between an emitter connection point of the first transistors and a first power supply;

wherein a higher base voltage is applied to the base of one of the first transistors than a base voltage applied to the base of the other first transistor, and wherein, with a difference in electric potential applied by the base voltages between bases of the pair of the first transistors to set a ratio of a current flowing through one of the pair of the first transistors to a current flowing through the other first transistor at about 1/100 or smaller, an amplitude of an output current of the driver circuit is controlled by the higher electric voltage applied to the base of one of the first transistors than to the base of the other first transistor; and a laser-diode module for outputting an optical-transmission wave by carrying out optical-intensity modulation on a laser diode on a basis of an output current signal or an output voltage signal output by the first differential-amplifier circuit.

19. An optical-transmission module comprising:

a first differential-amplifier circuit having composed of a pair of first transistors employing bipolar transistors with emitters thereof connected to each other and a first resistor with resistance in the range of about 2 to 20 Ω provided between an emitter connection point of the pair of the first transistors and first power supply;

wherein an amplitude of an output current of the driver circuit is controlled by electric potential applied to a base of at least one of the first transistors;

a laser-diode module for outputting an optical-transmission wave by carrying out optical-intensity modulation on a laser diode on a basis of an output current signal or an output voltage signal output by the first differential-amplifier circuit.

20. The optical-transmission module according to claim 18, wherein said driver circuit and said laser-diode module are mounted on a board.

21. The optical-transmission module according to claim 19, wherein said driver circuit and said laser-diode module are mounted on a board.

22. An optical-transmission module comprising:

a first differential-amplifier circuit having a pair of first transistors with emitters thereof connected to each other and a first resistor provided between an emitter connection point of the first transistors and a first power supply;

wherein a higher base voltage is applied to the base of one of the first transistors than a base voltage applied to the base of the other first transistor, and wherein, with a difference in electric potential applied by the base voltages between bases of the pair of the first transistors to set a ratio of a current flowing through one of the pair of the first transistors to a current flowing through the other first transistor at about $1/100$ or smaller, an amplitude of an output current of the driver circuit is controlled by the higher electric voltage applied to the base of one of the first transistors than to the base of the other first transistor; and a optical-modulation module for outputting an optical-transmission wave by modulating a light emitted by a light source on the basis of an output current signal or an output voltage signal output by said first differential-amplifier circuit.

23. An optical-transmission module comprising:

a first differential-amplifier circuit having composed of a pair of first transistors employing bipolar transistors with emitters thereof connected to each other and a first resistor with resistance in the range of about 2 to 20 Ω provided between an emitter connection point of the pair of the first transistors and first power supply;

wherein an amplitude of an output current of the driver circuit is controlled by electric potential applied to a base of at least one of the first transistors;

an optical-modulation module for outputting an optical-transmission wave by modulating a light emitted by a light source on the basis of an output current signal or an output voltage signal output by said first differential-amplifier circuit.

24. The optical-transmission module according to claim 22, wherein said driver circuit and said optical-modulation module are mounted on a board.

25. The optical-transmission module according to claim 23, wherein said driver circuit and said optical-modulation module are mounted on a board.

26. An optical-transmission module according to claim 20, wherein said driver circuit is implemented as a monolithic IC.

27. An optical-transmission module according to claim 21, wherein said driver circuit is implemented as a monolithic IC.

28. An optical-transmission module according to claim 24, wherein said driver circuit is implemented as a monolithic IC.

29. An optical-transmission module according to claim 25, wherein said driver circuit is implemented as a monolithic IC.

30. A driver circuit comprising:

a differential-amplifier circuit having a pair of transistors;

means for setting a ratio of a current flowing through one of the pair of transistors to a current flowing through the other transistor at about $1/100$ or smaller by applying a higher base voltage to the base of one of the pair of transistors than a base voltage applied to the other transistor; and means for controlling the amplitude of an output current of the driver circuit by the higher electric potential applied to said base of said one of said transistors.

31. An optical-transmission module comprising:

a driver circuit having a differential-amplifier circuit with a pair of transistors and means for setting a ratio of a current flowing through one of a pair of transistors to a current flowing through the other transistor at about $1/100$ or smaller by applying a higher base voltage to the base of one of the pair of transistors than a base voltage applied to the other transistor and means for controlling the amplitude of an output current by the higher electric potential applied to said base of said one of said transistors; and a optical-modulation module for outputting an optical-transmission wave by modulating a light emitted by a light source on the basis of an output current signal or an output voltage signal output by said differential-amplifier circuit.

* * * * *